June 7, 1960 G. ABRAHAM 2,939,965

ELECTRICAL SWITCHING CIRCUIT

Filed Dec. 20, 1956 2 Sheets-Sheet 1

INVENTOR
GEORGE ABRAHAM

BY W R Mattz
Richard C Reed
ATTORNEYS

June 7, 1960 G. ABRAHAM 2,939,965

ELECTRICAL SWITCHING CIRCUIT

Filed Dec. 20, 1956 2 Sheets-Sheet 2

INVENTOR
GEORGE ABRAHAM

BY

ATTORNEYS

United States Patent Office 2,939,965

Patented June 7, 1960

2,939,965

ELECTRICAL SWITCHING CIRCUIT

George Abraham, 3107 Westover Drive S.E., Washington, D.C.

Filed Dec. 20, 1956, Ser. No. 629,762

6 Claims. (Cl. 307—88.5)

(Granted under Title 35, U.S. Code (1952), sec. 266)

The invention described herein may be manufactured and used by or for the Government of the United States of America for governmental purposes without the payment of any royalties thereon or therefor.

The present invention relates in general to electrical signal translating circuits and in particular to multistable circuits.

In the field of electronics, a multistable circuit may find many useful applications. By way of example, in a counter, a plurality of multistable circuits, connected in tandem, may be used when it is desired to count pulses occurring either at regular intervals or at random. At present, counters employ conventional bistable circuits that have a number of disadvantages. For example, to obtain only two stable states, these circuits usually require a complicated arrangement using two transistors or two electron tubes. Thus, if several bistable circuits are utilized in a single counter, the physical size and weight of the counter will be appreciable. If electron tubes are used, the power consumption will be high and a large portion of the power supplied to the counter, because of the low efficiency, will be dissipated as heat.

In accordance with the foregoing, it is an object of the present invention to provide a multistable circuit having more than two stable states.

Another object of the present invention is to provide a multistable circuit employing a minimum number of circuit elements and requiring a negligible amount of power.

Another object of the present invention is to provide a multistable circuit whereby $n+1$ stable states may be obtained by connecting $n$ variable impedance devices in series.

Another object of the present invention is to provide a multistable electrical circuit in which a source of dynamic B+ is applied to a plurality of variable impedance devices connected in series to cause the storage of a steady state of electrical charge carriers in the variable impedance devices and thereby obtain a voltage controlled negative resistance curve on which a plurality of stable states may be located.

Other objects and many of the attendant advantages of this invention will be readily apparent as the same becomes better understood by reference to the following detailed description when considered in connection with the accompanying drawings wherein:

Fig. 1 discloses a typical embodiment of the present invention.

As used in the present application, "dynamic B+" is defined as a periodically varying potential applied to a selected nonlinear device to store energy therein and to enable the device to function as an amplifier and/or to exhibit a negative resistance characteristic. As an example, a source of dynamic B+ may be a source of recurring signals providing signals having a frequency or repetition rate greater than the reciprocal of electrical charge carriers injected into the variable impedance device to which the source of dynamic B+ is connected.

In accordance with the present invention, a multistable circuit is provided wherein a source of dynamic B+ is connected in series with a plurality of variable impedance devices to inject electrical charge carriers into a plurality of variable impedance devices at a rate greater than the electrical charge carriers decay due to recombination to maintain a steady state of stored electrical charge carriers in the variable impedance devices. The stored electrical charge carriers are used to obtain a composite negative resistance curve having a plurality of regions in which stable states of operation may be located. The number of these regions will be one more than the number of variable impedance devices connected in series with the source of dynamic B+. The multistable circuit thus obtained may be triggered to a desired stable state in several ways such as by varying the relative amplitude, phase, or width of pulses applied to a selected element of the variable impedance devices or by varying the bias, or by varying the impedance load on the variable impedance devices, or by varying the frequency, amplitude or phase of the dynamic B+ applied to the variable impedance devices. For example, triggering from a first stable state to a second stable state may be accomplished by applying a pulse of proper polarity and proper amplitude for a given load line to a desired element of a selected variable impedance device and a pulse of reverse polarity and the same amplitude will trigger the multistable circuit from the second to the first stable state.

Figure 1:
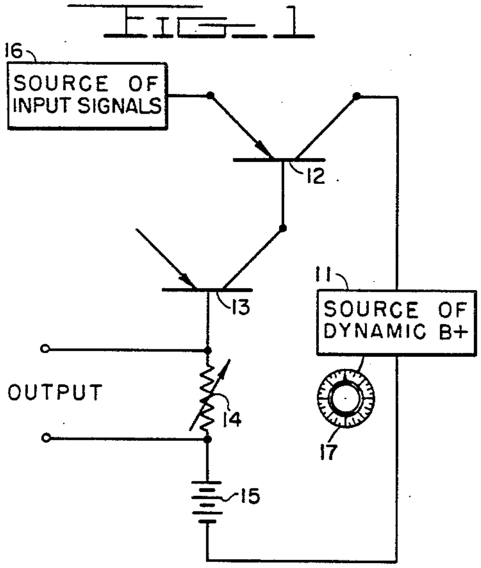

Referring to Fig. 1, the typical embodiment of the multistable circuit shown comprises a source of dynamic B+ 11 connected in series with variable impedance devices 12 and 13, variable resistor 14, and a source of direct current voltage 15. Control knob 17, which is connected to source of dynamic B+ 11, may be employed to manually vary such parameter of the source of dynamic B+ 11 as frequency, phase, duration and magnitude. The output of the multistable circuit is connected across variable resistor 14. A source of input signals 16 is connected to a selected element of variable impedance device 12. It is, of course, understood that the source of input signals 16 could be connected to another element of variable impedance device 12 or to a desired element of variable impedance device 13.

The variable impedance devices 12 and 13 may be any suitable devices wherein two or more electrical charge carriers having appropriate lifetimes are operative, for example, arc discharge devices or semi-conductor devices such as diodes, transistor triodes, transistor tetrodes or photo transistors. The electrical charge carriers may be any positive or negative charges such as electrons, ions or holes. The dynamic B+ may be any source of recurring signals so long as the frequency or repetition rate of the recurring signals is greater than the reciprocal of the lifetime of injected electrical charge carriers and so long as one element of each variable impedance device is driven positive with respect to another element of the variable impedance device during each cycle of operation.

In the present embodiment shown in Fig. 1, a constant voltage, square wave generator is used as a source of dynamic B+, the variable impedance devices used are point contact transistors of N-type material, and therefore, the injected electrical charge carriers are holes. Other types of dynamic B+ could be used in combination with a selected variable impedance device to maintain a steady state of electrical charge carriers. For example, a high frequency, sine wave oscillator could be used to inject and store electrons in a tetrode transistor having a P-type base material.

In the operation of the multistable circuit shown in Fig. 1, the source of dynamic B+ 11 is applied to variable impedance devices 12 and 13; and after a few cycles of operation, the number of holes stored in the variable impedance devices reach a steady state. Signals are then applied to the selected element of variable impedance devices 12 from the source of input signals 16 to trigger the multistable circuit to any one of a plurality of stable states.

In order to understand the operation of the multistable circuit shown in Fig. 1, it is necessary to appreciate the relationship between several factors that affect the number of holes stored in the steady state. When the variable impedance devices 12 and 13 are N-type, point contact transistors, the factors to be considered may be listed as follows: the transistor impedance, the load impedance, the bias, and the parameters of the dynamic B+ such as frequency, magnitude, phase and duration.

As indicated, the number of holes that will be stored in N-type base material of a point contact transistor will be determined in part by the internal impedance of the transistor i.e., by the barrier capacitance, barrier resistance, base capacitance and base resistance of the transistor. As will be explained presently, the transistor impedance is not static but varies with or is modulated by the dynamic B+ applied to the transistor.

The transistor impedance is dependent in part on such factors as the lifetime of the electrical charge carriers and diffusion length in the base material of the transistor. These factors in turn are determined by the material used and the process of manufacturing the transistor. The internal impedance is also dependent in part on the conditions under which the transistor is operated in a particular circuit. This will become apparent during the analysis of Figs. 2A, 2B and 2C which, it will be recalled, represent the equivalent circuit of a transistor before, during and immediately after the application of dynamic B+.

Figure 2A:
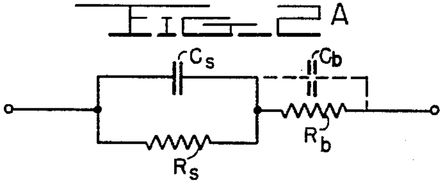
Fig. 2A represents the equivalent circuit of a transistor before dynamic B+ is applied.

Referring to Fig. 2A, when no dynamic B+ is applied to a transistor, if the transistor is a point contact unit having, N-type, 5 ohm/cm. base material, the value of the barrier capacitance $C_s$ will be approximately 3 $\mu\mu$f., the value of the barrier resistance $R_s$ will be approximately 5,000 ohms, the base capacitance $C_b$ will be less than 0.2 $\mu\mu$f. which normally may be neglected and the base resistance $R_b$ will be approximately 100 ohms. The value of each impedance will be determined in part by the material used and the process of manufacture of the point contact transistor.

Figure 2B:
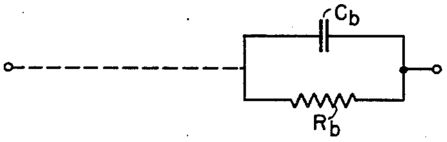
Fig. 2B represents the equivalent circuit during the application of dynamic B+.

In the preferred embodiment of the present invention, a large magnitude of square wave dynamic B+ is applied to the transistor. As the dynamic B+ increases to its positive maximum value, there is considerable diffusion of electrical charge carriers into the base, and the value of the base capacitance $C_b$ becomes relatively large, approximately 350 $\mu\mu$f. The base resistance $R_b$ becomes smaller, approximately 60 ohms. As shown in Fig. 2B, these values cannot be neglected. The barrier capacitances $C_s$, because of the increased storage of electrical charge carriers, becomes larger, approximately 200 $\mu\mu$f. but the barrier resistance $R_s$ approaches zero, shunting out the increased barrier capacitance $C_s$. The barrier capacitance $C_s$ and barrier resistance $R_s$ may, therefore, be neglected as shown in Fig. 2B.

Figure 2C:
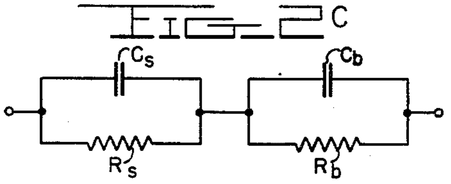
Fig. 2C represents the equivalent circuit immediately after the dynamic B+ has been removed from the transistor.

As shown in Fig. 2C, when the dynamic B+ goes to zero, the barrier capacitance $C_s$ instantaneously returns from the larger value of 200 $\mu\mu$f. to the smaller value of 3 $\mu\mu$f. and the barrier resistance $R_s$ instantaneously returns from approximately zero to 100 ohms. The base resistance $R_b$, however, returns slowly from the smaller value of 60 ohms to the larger value of 100 ohms and the base capacitance $C_b$ returns slowly from the larger value of 350 $\mu\mu$f. to the smaller value of 0.2 $\mu\mu$f. Before the base capacitance $C_b$ can attain its smaller value another pulse of dynamic B+ is applied to the transistor to return the base capacitance $C_b$ to its larger value. If a series of pulses are applied by the dynamic B+ to the transistor at a frequency greater than the reciprocal of the lifetime of the injected electrical charge carriers, after a few cycles of operation, the base capacitance $C_b$ will attain an average value. The number of electrical charge carriers stored in the base capacitance $C_b$ will, likewise, attain an average value or steady state that will be dependent in part upon the magnitude, duration, and frequency of the dynamic B+ applied to the transistor.

Figure 5:
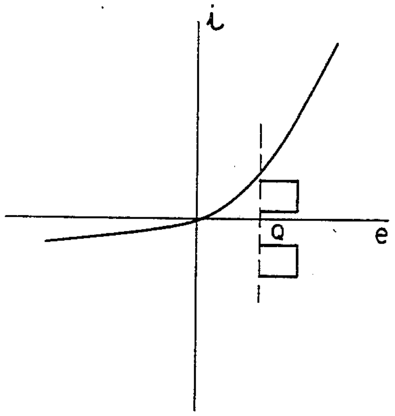
Fig. 5 represents the barrier resistance characteristic curve of a transistor.
Figure 6:
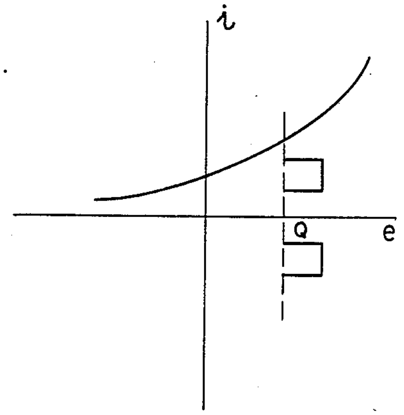
Fig. 6 represents the barrier capacitance characteristic curve of a transistor.

Referring to Figs. 5 and 6, it is noted that the barrier capacitance and barrier resistance characteristic of a transistor are nonlinear and that the quiescent value of the barrier capacitance and resistance are dependent upon the bias applied to the transistor. As shown in Figs. 5 and 6, when dynamic B+ is applied to the transistor, the barrier capacitance and barrier resistances vary in dependency upon the magnitude of the dynamic B+. These variations determine in part the magnitude of the steady state as explained in connection with Figs. 2A, 2B and 2C.

The number of electrical charge carriers stored in the steady state is dependent in part upon the value of the load impedance and consequently may be varied by changing the value of load impedance. Hence, in Fig. 1, the magnitude of the steady state may be controlled by variable resistor 14.

The number of electrical charge carriers stored in the steady state will affect the shape of the composite voltage-current characteristic curve of transistors 12 and 13 in the circuit shown in Fig. 1.

Figure 3:
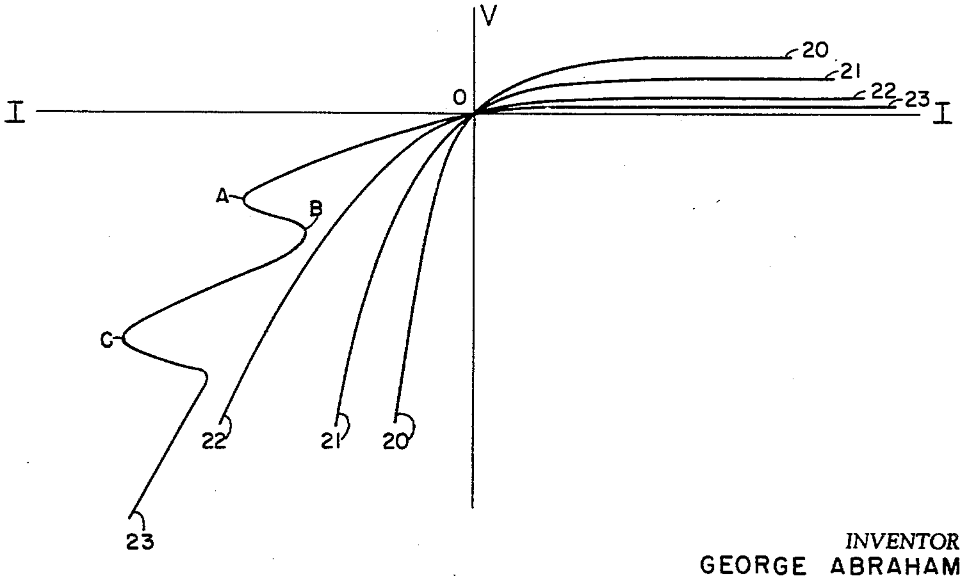
Fig. 3 represents the composite negative resistance curves of the variable impedance devices in the circuit shown in Fig. 1.

Referring to Fig. 3, curve 20 represents the compositive voltage-current characteristic curve of variable impedance devices 12 and 13 when the magnitude of the dynamic B+ applied to the transistors is zero. Curve 21 represents the composite voltage-current characteristic when a relatively small magnitude of dynamic B+ is applied and curves 22 and 23 represent the voltage-current characteristic when the relative magnitude of dynamic B+ is increased, the magnitude of dynamic B+ applied to obtain curve 23 being greater than the magnitude applied to obtain curve 22. It is noted that as the magnitude of dynamic B+ is increased, the conductivity of variable impedance devices 12 and 13 increases i.e., the current flow through the variable impedance devices, per unit of voltage applied, increases. This, in effect, is feedback which results in regeneration and is attributed to the storage of electrical charge carriers. Thus, in the circuit shown in Fig. 1, as the magnitude of the dynamic B+ is increased, the number of stored electrical charge carriers is increased, and curve 20 assumes the position of curve 22.

Similar results could be obtained by maintaining the magnitude of the dynamic B+ constant and changing another factor that controls the number of minority electrical charge carriers stored, such as, the duration or frequency of the dynamic B+.

In order to understand the shape of curve 23, it is necessary to bear in mind that the properties of the same type of transistor manufactured and formed of the same material and by the same process will vary slightly. The internal impedance and, therefore, the voltage across variable impedance devices 12 and 13 connected in a series circuit will be different. It is noted that since variable impedance devices 12 and 13 are connected in a series circuit, curve 23 is a composite voltage-current characteristic of the two variable impedance devices. Thus, the portion of curve 23 from O to B may be attributed primarily to the build-up of electrical charge carriers in variable impedance device 12 and the portion of curve from B to D may be attributed primarily to the build-up of electrical charge carriers in variable impedance device 13. As the magnitude of the dynamic B+ applied to the circuit shown in Fig. 1 increases and the proportion of the voltage across variable impedance device 12 increases, regeneration causes a part of curve 22 to assume the position of portion OA of curve 23. As the voltage across variable impedance device 12 increases further, regeneration is increased until with sufficient regeneration negative resistance appears at point A on the curve 23. Thereafter, increased voltage across variable impedance device 12 will form the negative resistance portion of curve 23. Essentially the same curve forming process will reoccur as the voltage across variable impedance device 13 increases to cause a part of curve 22 to assume the position of the portion CD of curve 23. Thus, it is seen that variable impedance devices 12 and 13 have different impedance levels.

The curve 23 depicts a composite voltage-current curve having a characteristic which is generally termed in the art as an S type, "voltage controlled" or "short circuit stable" negative resistance characteristic. For purposes of the present disclosure, the term "short circuit stable" is employed to define this type of negative resistance characteristic.

Figure 4:
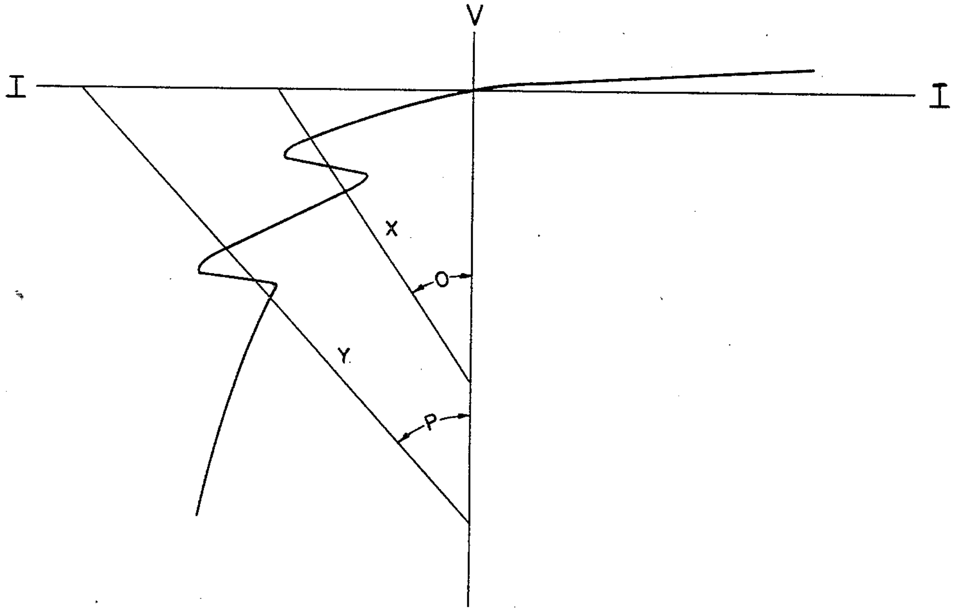
Fig. 4 represents the load lines drawn on the composite negative resistance curve of the variable impedance devices in the circuit shown in Fig. 1.

Referring to Fig. 4, it is noted that two load lines X and Y are drawn on the composite voltage-current characteristic curve of the multistable circuit shown in Fig. 1. Load line X is drawn through a point on the voltage ordinate in Fig. 4 that is determined by the bias applied to variable impedance device 12 by the source of direct current voltage 15 at an angle O whose cotangent is equal to the sum of resistance 14 and the impedance of variable impedance device 13 i.e., the sum of the impedance load on variable impedance device 12 assuming other impedances in the circuit are negligible. Load line Y is drawn through a point on the voltage ordinate in Fig. 4 that is determined by the bias applied to variable impedance device 13 by the source of direct current voltage 15 at an angle P whose cotangent is equal to the sum of resistance 14 and the impedance of variable impedance device 12 i.e., the sum of the impedance load on variable impedance device 13, assuming other impedances in the circuit are negligible. It is noted that the load lines X and Y intersect the composite voltage-current characteristic curve in regions where the slope of the curve is negative as well as positive. The points of intersection in the positive region represent stable states of operation for the multistable circuit shown in Fig. 1. It is readily apparent, therefore, that the multistable circuit shown in Fig. 1 may be triggered from one stable state to another by the magnitude and polarity of the voltage applied to the selected element to increase the current through variable impedance device 12 by the source of input signals 16 in Fig. 1. The multistable circuit shown in Fig. 1 may, likewise, be triggered by varying the slope of load lines X or Y, or by varying the phase, or duration of the signals applied to variable impedance devices 12 or 13, by varying the bias, or by varying the frequency, phase or duration of the dynamic B+ 11 applied to the variable impedance devices.

It should be understood, of course, that the foregoing disclosure relates to only a preferred embodiment of the present invention and that it is intended to cover all changes and modifications of the example of the invention herein chosen for the purposes of disclosure, which do not constitute departures from the spirit and scope of the invention.

Having thus described the invention, what is claimed is:

1. An electrical circuit having a composite voltage-current characteristic with a plurality of negative resistance regions, comprising a plurality of devices, each capable of exhibiting a negative resistance characteristic, means for connecting said plurality of devices in series, means connected to said devices for energizing said devices such that each of said devices has a negative resistance characteristic of the short circuit stable type, and control means connected to said electrical circuit for biasing said devices for operation at selected points on said composite voltage-current characteristic.

2. The circuit as defined in claim 1 wherein said means for energizing said devices is a high frequency signal generating means for applying a series of pulses having a selected period to said devices whereby minority charge carriers are injected therein, each pulse having a selected magnitude and said series of pulses having a repetition rate greater than the reciprocal of the lifetime of the minority charge carriers.

3. The circuit as defined in claim 1 wherein said means for connecting said plurality of devices in series includes a variable impedance element.

4. In an electrical circuit having a composite voltage-current characteristic with a plurality of stable states, a plurality of variable impedance devices, each having at least a first element and a second element, signal generating means connected in a loop with said plurality of variable impedance devices for applying a series of pulses having a selected period to the first element in each of said plurality of variable impedance devices such that the first element in each variable impedance device is forward biased with respect to the second element during each period, whereby minority charges carriers are injected into each variable impedance device, each pulse having a selected magnitude and said series of pulses having a repetition rate greater than the reciprocal of the lifetime of the minority charge carriers whereby a short circuit stable negative resistance characteristic is obtained, and control means connected to said electrical circuit for biasing said devices for operation at selected points on said composite voltage-current characteristic.

5. In an electrical circuit having a plurality of stable states, a plurality of variable impedance devices, each having at least a first element and a second element, means for applying a selected bias to the variable impedance devices in the low-conduction direction, signal generating means connected in a loop with said plurality of variable impedance devices for applying a series of pulses having a selected period to the first element in each of said plurality of variable impedance devices such that the first element in each variable impedance device is forward biased with respect to the second element during each period, whereby minority charge carriers are injected into each variable impedance device, each pulse having a selected magnitude and said series of pulses having a repetition rate greater than the reciprocal of the lifetime of the minority charge carriers whereby a short circuit stable negative resistance characteristic is obtained, and control means connected to said electrical circuit for biasing said devices for operation at selected points on said composite voltage-current characteristic.

6. In an electrical circuit having a plurality of stable states, a plurality of variable impedance devices, each having at least a first element and a second element, an impedance element, signal generating means connected in a loop with said impedance element and said plurality of variable impedance devices for applying a series of pulses having a selected period to the first element in each of said plurality of variable impedance devices such that the first element in each variable impedance device is forward biased with respect to the second element during each period, whereby minority charge carriers are injected into each variable impedance device, each pulse having a selected magnitude and said series of pulses having a repetition rate greater than the reciprocal of the lifetime of the minority charge carriers whereby a short circuit stable negative resistance characteristic is obtained, means for applying a selected bias to the variable impedance devices in the low-conduction direction, means connected to a selected one of said variable devices for triggering said electrical circuit to a selected stable state, an output circuit, and means connecting said output circuit across said impedance element.

References Cited in the file of this patent

UNITED STATES PATENTS

| | | |
|---|---|---|
| 2,476,323 | Rack | July 19, 1949 |
| 2,585,078 | Barney | Feb. 12, 1952 |
| 2,585,571 | Mohr | Feb. 12, 1952 |
| 2,644,892 | Gehman | July 7, 1953 |
| 2,644,893 | Gehman | July 7, 1953 |
| 2,666,816 | Hunter | Jan. 19, 1954 |
| 2,708,720 | Anderson | May 17, 1955 |
| 2,829,281 | Van Overbeek | Apr. 1, 1958 |
| 2,838,664 | Wolfendale | June 10, 1958 |
| 2,843,765 | Aigrian | July 15, 1958 |
| 2,890,353 | Van Overbeek | June 9, 1959 |

FOREIGN PATENTS

| | | |
|---|---|---|
| 509,450 | Belgium | Mar. 15, 1952 |
| 160,213 | Australia | Dec. 10, 1954 |